(12) United States Patent
Mendes (10) Patent No.: US 7,000,534 B1
(45) Date of Patent: Feb. 21, 2006

(54) MODULAR FRUIT JUICE EXTRACTION SYSTEM AND CONFIGURATION FOR A SELF-CLEANING FILTER FOR THE EXTRACTION OF FRUIT JUICE

(76) Inventor: Carlos Neto Mendes, Avenida Eng Camilo DiNucci 5717, Araraquara, S.P. (BR)

( * ) Notice: Subject to any disclaimer, the term of this patent is extended or adjusted under 35 U.S.C. 154(b) by 918 days.

(21) Appl. No.: 09/641,790

(22) Filed: Aug. 18, 2000

Related U.S. Application Data (63) Continuation-in-part of application No. 09/377,936, filed on Aug. 20, 1999, now abandoned, and a continuation-in-part of application No. 09/377,937, filed on Aug. 20, 1999, now abandoned.

(51) Int. Cl.
*B30B 9/02* (2006.01)

(52) U.S. Cl. .................... 100/98 R; 100/108; 100/112; 100/116; 100/209; 100/213; 99/509

(58) Field of Classification Search .............. 100/98 R, 100/108, 213, 116, 209, 107, 128, 129, 186, 100/112; 99/506–509
See application file for complete search history.

(56) References Cited

U.S. PATENT DOCUMENTS

| | | | | |
|---|---|---|---|---|
| 2,116,325 A | * | 5/1938 | Rogers | 100/108 |
| 2,346,561 A | * | 4/1944 | Delay | 100/108 |
| 2,420,679 A | * | 5/1947 | Pipkin | 100/108 |
| 2,534,554 A | * | 12/1950 | Kahre | 100/98 R |
| 2,856,846 A | * | 10/1958 | Belk | 100/108 |
| 3,162,114 A | * | 12/1964 | Quiroz | 100/108 |
| 3,269,301 A | * | 8/1966 | Krause | 100/108 |
| 3,682,092 A | * | 8/1972 | Breton et al. | 100/108 |
| 4,154,163 A | * | 5/1979 | Niemann | 100/108 |
| 4,376,409 A | * | 3/1983 | Belk | 100/108 |
| 4,459,906 A | * | 7/1984 | Cound et al. | 100/98 R |
| 4,951,563 A | * | 8/1990 | Warren et al. | 100/213 |
| 5,655,441 A | * | 8/1997 | Mendes | 100/98 R |
| 5,720,218 A | * | 2/1998 | Mendes | 100/108 |
| 5,720,219 A | * | 2/1998 | Mendes | 100/98 R |
| 5,802,964 A | * | 9/1998 | Mendes | 100/98 R |

FOREIGN PATENT DOCUMENTS

EP              0757896 A1 * 2/1997

* cited by examiner

*Primary Examiner*—Stephen F. Gerrity
(74) *Attorney, Agent, or Firm*—Beusse, Brownlee, Wolter, Mora & Maire, P.A.

(57) ABSTRACT

Modular fruit juice extraction apparatuses and systems are provided that comprise, for example, a linear actuator (2) effective to drive, by back and forth motion, a moveable peeler cup (4) in communication with each of two ends of the extraction apparatus. In such embodiment, each moveable peeler cup (4), comprising concave and radially cut hemispheres, moves against a respective fixed peeler cup (3), and thereby compresses a fruit (19) contained therein to obtain its juice, which passes through a filtering device (7) disposed in each respective fixed peeler cup (3). A plunger (8) is variously driven through the filtering device (7) to remove the fruit core (13). Other embodiments include an embodiment in which a linear actuator (202) drives both external moveable peeler cups (203) and internal moveable peeler cups (204).

37 Claims, 8 Drawing Sheets

Device 7

MODULAR FRUIT JUICE EXTRACTION SYSTEM AND CONFIGURATION FOR A SELF-CLEANING FILTER FOR THE EXTRACTION OF FRUIT JUICE

This application is a continuation-in-part of U.S. Ser. No. 09/377,936, filed Aug. 20, 1999, now abandoned and this application also is a continuation-in-part of U.S. Ser. No. 09/377,937, filed Aug. 20, 1999 (now abandoned).

The entirety of these previous applications are incorporated herein by reference as if set forth in full below. Also, the following patent applications, for which priority is not claimed, are also incorporated herein by reference, specifically for the teachings as to details of the fruit juice extraction device disclosed therein, including the components thereof and their variations: U.S. Ser. No. 09/028,187 filed Feb. 23, 1998; U.S. Ser. No. 08/884,529 filed Jun. 27, 1997; U.S. Ser. No. 08/763,679 filed Dec. 11, 1996; U.S. Ser. No. 08/759,727 filed Dec. 6, 1996; U.S. Ser. No. 08/759,722 (now U.S. Pat. No. 5,720,219) filed Dec. 6, 1996; U.S. Ser. No. 08/759,723 filed Dec. 6, 1996; U.S. Ser. No. 08/759,724 filed Dec. 6, 1996; U.S. Ser. No. 08/681,622 filed Jul. 29, 1996; U.S. Ser. No. 08/681,623 filed Jul. 29, 1996; U.S. Ser. No. 08/681,624 filed Jul. 29, 1996; U.S. Ser. No. 08/681,625 filed Jul. 29, 1996; U.S. Ser. No. 08/681,626 (now U.S. Pat. No. 5,802,964) filed Jul. 29, 1996; U.S. Ser. No. 08/681,658 filed Jul. 29, 1996; U.S. Ser. No. 08/681,627 (now U.S. Pat. No. 5,720,218) filed Jul. 29, 1996; U.S. Ser. No. 08/681,628 filed Jul. 29, 1996; and U.S. Ser. No. 08/647,066 (now U.S. Pat. No. 5,655,441) filed May 9, 1996.

The present patent of invention refers to both "IMPROVEMENTS IN A MODULAR FRUIT JUICE EXTRACTION SYSTEM and CONFIGURATION FOR A SELF-CLEANING FILTER FOR THE EXTRACTION OF FRUIT JUICE." For "IMPROVEMENTS IN A MODULAR FRUIT JUICE EXTRACTION SYSTEM" or be it, as the nomenclature implies, a system developed with the purpose of obtaining juice from citrus fruit such as orange, grapefruit, lemon, lime, tangerine, mekan, pokan, etc., and other round or near-round non-citrus fruit. The important characteristics of the present system includes: compactness, modularity, durability, simplicity and the highest quality of the juice obtained form extraction. For "CONFIGURATION FOR A SELF-CLEANING FILTER FOR THE EXTRACTION OF FRUIT JUICE" or more fully, "IMPROVED CONFIGURATION FOR A SELF-CLEANING FILTER WITH REMOVABLE PERFORATING POINT FOR THE EXTRACTION OF FRUIT JUICE," or be it, as the nomenclature implies, a cylindrical filter constructed of stainless steel or other food grade, nontoxic materials developed with the purpose of obtaining juice from citrus fruit such as orange, grapefruit, lemon, lime, tangerine, mekan, pokan, etc., and other round or near-round non-citrus fruit. The important characteristics of the present configuration includes: better filtration efficiency, greater juice yield as well as increased self-cleaning and sanitization characteristics obtained due to its design, compactness and simplicity thus contributing further to increase juice quality and juice yield as obtained in fruit juice extraction processes.

THE STATE OF THE ART

The state of the art is known from previous patents by the same inventor, including U.S. Pat. No. 5,655,441, U.S. Pat. No. 5,720,218, U.S. Pat. No. 5,720,219 and U.S. Pat. No. 5,802,964, which revolutionized the market by introducing a method of juice extraction which eliminated the traditionally bitter tastes in citrus juices, by eliminating the contact of peel with the juice being extracted.

This equipment primarily based its advantages in the process of peeling the fruit before juice extraction, by means of a fixed peeler cup (concave and radially cut hemisphere) and by meshing with an identical movable peeler cup (concave and radially cut hemisphere), which in their relative motion act together to shear the peel in longitudinal strips. Immediately after, the core of the fruit enters a filtering device which allows juice to pass through its radially cut slits, and is collected into a juice collector which has an lower side opening on one of its ends, so that it allows the juice to, by gravity, flow into a collecting juice tank. The dried fruit core is then pushed, by a plunger, back in the direction of the filter's opening, in a manner that expels the core completely, allowing the core to drop vertically through the peeler cups and into the peel and core reservoir or transport devices.

In the above described fruit juice extraction process, cylindrical filters with radial slits are used. These filters include at their front end a sharp knife-edged cylindrical cutting point that perforates the fruit at a point in the compression stage of said fruit, permitting that shearing of the fruit peel can be achieved while simultaneously transforming the fruit from its hemispherical shape into peelings, and permitting that a cylindrically shaped fruit core can be separated from other parts of the fruit and that said fruit core can ultimately be pumped completely into the cylindrical filter with radial slits. Since the cylindrical filter has a multitude of radial slits along its body, this allows the juice to flow through said slits and gravitate into a space around the filter defined as the juice collector chamber. Since the juice collector chamber has an opening at one of its ends, the juice is able to flow through the opening and fall into a juice reservoir, which is placed directly underneath said juice collector.

In the juice extraction systems described above, the cylindrical filters are subject to continuous duty operation where the perforating cutting edged points are subject to wear and damage while the remainder of the filter is protected from such possible break downs. Also the parallel shaped slits, while permitting juice to flow through, will occasionally clog and cause higher pressures in the chamber to occur, thus decreasing filtration performance. The filter must therefore be taken out for cleaning and sanitization in order to return to its optimal performance capabilities.

Other advances have been introduced in this system and have been the object of other patents and patent applications, nevertheless, always encompassing the original scope of the basic invention.

OBJECTIVES OF THE INVENTION

The present invention in "IMPROVEMENTS IN A MODULAR FRUIT JUICE EXTRACTION SYSTEM" maintains the primary characteristics of the original patents, nevertheless, its objective is to propose a unique modular configuration where the movement of the movable peeler cups, within the scope of a modular system, is configured in a manner that fruit juice can be extracted at both ends of this basic module and the linear drive motion of the moveable peeler cups is configured such that both movable peeler cups can be driven by a single linear actuator. This solution not only generates a large cost/benefit advantage since the productivity of each complete extraction cycle is doubled, it also generates a singular and innovative basic module that can be aligned in parallel with other basic modules, or any other geometrical configurations, in manners that large numbers of these modules can be placed and arranged to multiply greatly the total productivity of small, medium or large fruit juice production plants.

The quality and organoleptic characteristics of the juice extracted is maintained as described in the original patents, and greatly improved in relation to older technologies, be it those of small, medium or large scale machinery. The high degree of modularity, and therefore scaleability, is an important benefit of the invention here proposed, as it facilitates and permits growth of productivity on a modular basis, allowing for an initial single module to be used and permitting that, over time, many, perhaps 100 or more, modules can be installed in juice production facilities, permitting flexible and economic growth of one's juice production plant. This is an important feature of this invention because this permits smaller scale juice production facilities to grow to extremely large, multi-million-gallon per year juice plants, and, independently of size or production capabilities, to gain the advantages of the quality and organoleptic improvements in the juice extracted.

In general terms, the objective of this invention is a concept of a machine composed of two pairs of peeler cups where for each fixed peeler cup, attached to the basic structure of the machine, and an equivalent and matching moveable peeler cup is fixed to opposite ends of a single linear actuator that drives, in a back and forth cycle, both movable peeler cups. In this configuration, the system is composed of a single moveable peeler cup at each of the extreme ends of the linear actuator, driven in a manner that one maximizes the utilization and productivity of the drive motion, since as one moveable peeler cup is opening to allow a fruit to fall within its concave and radially cut chamber, formed in conjunction with its matching fixed peeler cup, the moveable peeler cup at the opposite end is closing upon the fruit inside the chamber and shearing the fruit's skin as it initiates the peeling process and continues on to complete the juicing cycle by pumping the fruit's core into the filtering device. This configuration therefore permits significant economies of space, complexity, weight, energy and costs, and assures a simple basic modular unit for use in multiple numbers, limited only by the desired juice production capacity, which varies greatly from customer to customer.

By utilizing a simple linear actuator concept for driving the moveable peeler cups, one can employ various drive technologies, including hydraulic, pneumatic, electric, geared, screw and/or any combination of known linear drive systems. Since the drive movement is restricted to a simple linear back and forth action, one can assure greater simplicity of construction and therefore greater reliability, less energy consumption, lower weight and lower manufacturing costs with this invention, as compared to older nonlinear actuation systems that employ, cams, cam followers, gearboxes, electrical motors, levers, springs, and other complicated, more numerous and less reliable and more costly devices and systems.

The present invention in "CONFIGURATION FOR A SELF-CLEANING FILTER FOR THE EXTRACTION OF FRUIT JUICE" maintains the primary characteristics of the original patents, nevertheless, its objective is to propose a simple and unique configuration that improves filtration performance and adds to operational flexibility, increases filter life and contributes significantly to improving the cost/benefit and economic performance of this important component in the fruit juice extraction process. The quality and organoleptic characteristics of the juice extracted is maintained as described in the original patents, and greatly improved in relation to older technologies, be it those of small, medium or large scale machinery.

To generate the improvements describe above, the present invention proposes a configuration that consists of a removable cylindrical perforating cutting edge which is attached, by threads or other methods, to a main cylindrical body of the filter which has a multitude of transverse radial slits with conical, or V-shaped, formats. These conically shaped transverse radial slits are positioned parallel with respect to each other and, can be spaced and sized variably, dependent on the juice product desired to be produced. The proposed invention functions by first perforating the fruit's peel in a manner such that it permits the pumping action of a moveable peeler cup (a concave and radially cut hemisphere) to force a core section of fruit to enter completely into said filter, where simultaneously, due to the high pressure generated by the action, the juice is forced to flow through the multitude of conically shaped transverse radial slits that are positioned parallel with respect to each other, thus separating and filtering the liquid juice from solid components of the fruit. The removable cylindrical perforating cutting edge simplifies replacement and permits for interchangeability with differently shaped cutting edges which can vary as desired in order to obtain better juice extraction performance on the many varieties of citrus and other fruit.

Other important improvements obtained from this invention are greater efficiency and yield in juice extraction, as a function of the conical, or V-shaped, profile of the multiple transverse radial slits, since this shape generates a greater pressure differential between the inside and outside portions of the filter, in fact, inducing a "Venturi Effect" which accelerates fluid flow from the inside to the outside of the filter, thus promoting greater juice yield and greater productivity and helping greatly to maintain these passageways clear of obstructions and reducing clogging and cleaning frequency.

ADDITIONAL CONFIGURATIONS

The present invention in "IMPROVEMENTS IN A MODULAR FRUIT JUICE EXTRACTION SYSTEM" contemplates various interchangeable versions or embodiments of detailed configurations, differences mostly are related to the peeler cups, expulsion of the fruit's core through one of the peeler cups, actuation of the plunger and its function to expel the fruit's dried core, after the juice has been extracted and filtered. A first version or the preferred embodiment is configured in a manner such that the plunger is driven by two linear actuators mounted parallel to the main peeler cup actuator, so that when driven, these two linear actuators will pull on in-line rods that are attached to a cross member which is fixed to the plunger so that the plunger will move linearly inside the filtering device, pushing the fruit's core until it has reached the opening of the filter and overshooting until the core is totally expelled and permitted to fall vertically within, and through the peeler cups, and finally dropping into the core receiving duct.

In a second embodiment or version, the machine is configured in a manner such that the plunger is driven by the returning motion of the moveable peeler cup itself, since the in-line pull rods are attached to the cross members that hold the moveable peeler cups, and as the machine is cycled normally through its back and forth motion, the in-line rods, that are attached to a cross member which is fixed to the plunger, will drive the plunger to move linearly inside the filtering device, pushing the fruit's core until it has reached the opening of the filter and overshooting until the core is totally expelled and permitted to fall vertically within and through the peeler cups and, finally dropping into the core receiving duct.

In another embodiment or version, the plunger is driven in same manner as twice described before above, but the drive is provided by direct force being applied to the plunger by independent linear actuators mounted directly on the machine's basic structure, one at each of the opposite extreme ends of said machine.

In a third embodiment or version, the expulsion of the fruit's core is through the back side of the movable peeler cup.

In a fourth embodiment or version, the expulsion of the fruit's core through the back side of an internal movable peeler cup.

BRIEF DESCRIPTION OF THE DRAWINGS

The invention will be described in the following attached drawing figures, which will illustrate details including:

FIG. 4: A side cross-sectional view of the invention, as described before, in its second embodiment or version, showing, on the left side, a moveable peeler cup in the full open position, as well as the expulsion of the fruit's core and its falling into the fruit core collector duct, as well as the vertical falling of the sheared peeled skins. On the right side, one can observe the closed position of the moveable peeler cup, fully engaged with the fixed peeler cup, as well as the juice being filtered through the filtering device while the fruit's core remains inside the filter itself at this point in the extraction cycle. Also shown is the juice being collected in the juice collection chamber, sheared peel skin strips falling vertically down and, finally, dried fruit cores falling further through the fruit core receiving duct, in a manner that all of the byproducts being produced cane now be directed respectively to other stages of processing;

FIG. 9: A longitudinal cross sectional segment view of the main body of the filter showing the conical, or V-shaped, nature of the transverse radial slits though which the juice flow through;

FIG. 10: A side cross-sectional view of the invention, as described before, in its third embodiment or version, showing, on the left side, a moveable peeler cup in the full open position, as well as the expulsion of the fruit's core through the back side of the movable peeler cup and its falling into the fruit core collector duct, as well as the vertical falling of the sheared peeled skins. On the right side, one can observe the closed position of the moveable peeler cup, fully engaged with the fixed peeler cup, as well as the juice being filtered through the filtering device while the fruit's core remains inside the filter itself at this point in the extraction cycle. Also shown is the juice being collected in the juice collection chamber, sheared peel skin strips falling vertically down and, finally, dried fruit cores falling further through the fruit core receiving duct, in a manner that all of the byproducts being produced can now be directed respectively to other stages of processing;

FIG. 12: A side cross-sectional view of the invention, as described before, in its fourth embodiment or version, showing, on the left side, external and internal moveable peeler cups in the full open position, as well as the expulsion of the fruit's core through the back side of the internal movable peeler cups and its falling into the fruit core collector duct, as well as the vertical falling of the sheared peeled skins. On the right side, one can observe the closed position of the moveable peeler cup, fully engaged with the fixed peeler cup, as well as the juice being filtered through the filtering device while the fruit's core remains inside the filter itself at this point in the extraction cycle. Also shown is the juice being collected in the juice collection chamber, sheared peel skin strips falling vertically down and, finally, dried fruit cores falling further through the fruit core receiving duct, in a manner that all of the byproducts being produced can now be directed respectively to other stages of processing; and, FIG. 13: A top view of the embodiment of the invention of FIG. 12 taken along the LINE 13—13 of FIG. 12.

DETAILED DESCRIPTION OF THE INVENTION

The "IMPROVEMENTS IN A MODULAR FRUIT JUICE EXTRACTION SYSTEM," object of this application for patent of invention, consists essentially of a modular system shown in four optional and functionally interchangeable embodiments or versions, which vary in the drive configuration of the plunger, its function being to expel the dried fruit core and, in so doing, clear the way for receiving a new fruit to be juiced; and the means for expelling the fruit's core through the back side of a movable peeler cup.

Figure 1:
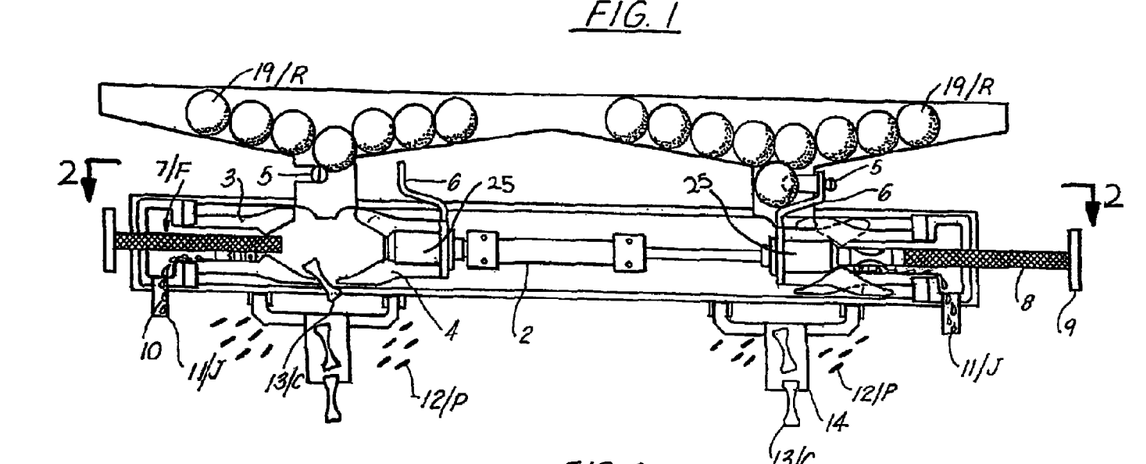
FIG. 1: A side cross-sectional view of the invention, as described before, in its first or preferred embodiment or version.
Figure 2:
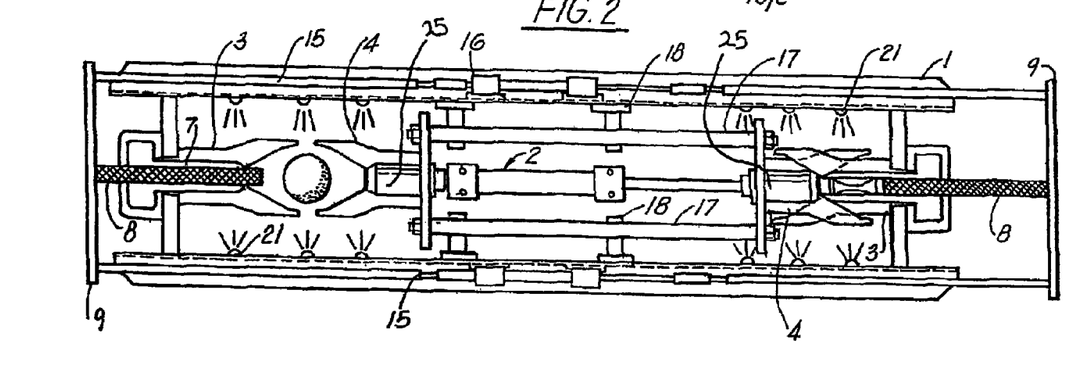
FIG. 2: A top view of the embodiment of the invention of FIG. 1 taken along the LINE 2—2 of FIG. 1.
Figure 3:
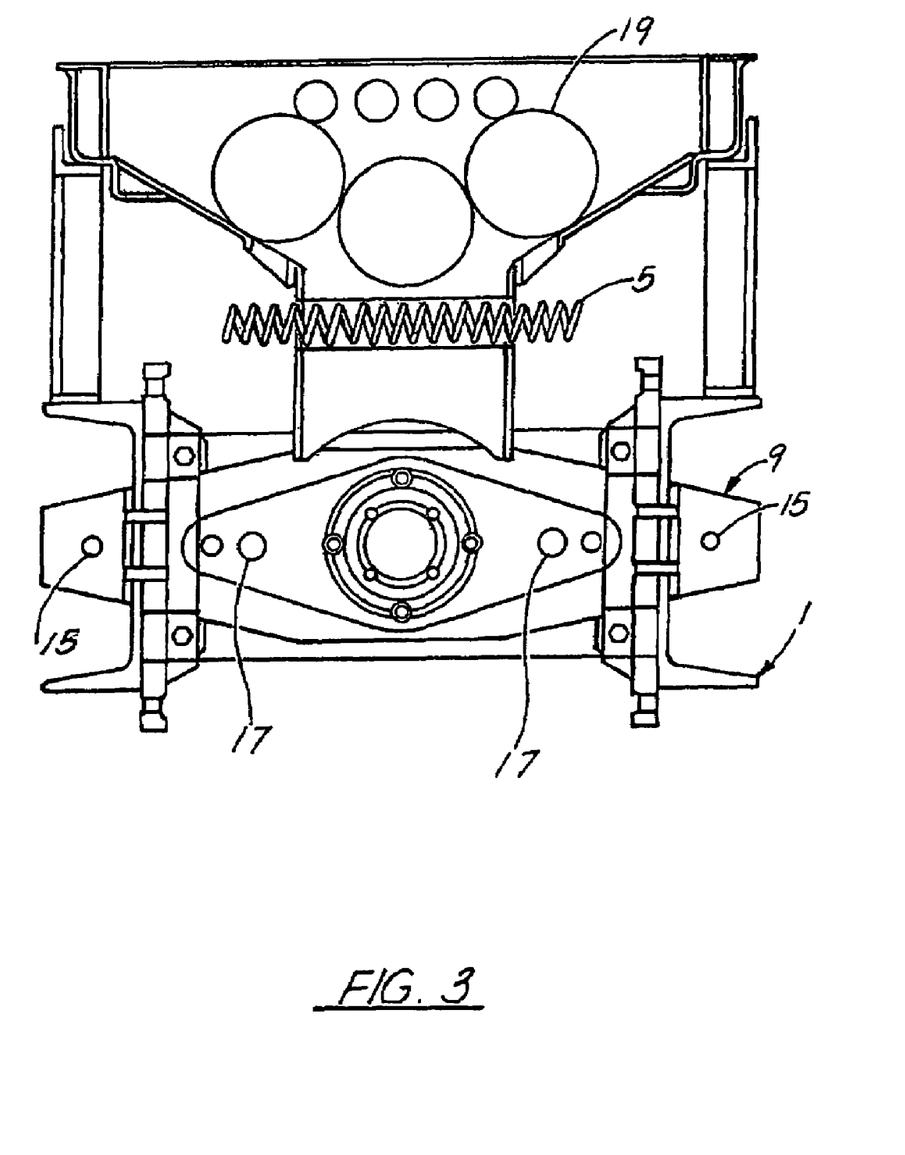
FIG. 3: A front view of the invention of FIG. 1.

In the first or preferred embodiment or version, best seen in FIGS. 1–3, a linear actuator (2) drives moveable peeler cups (4) (concave and radially cut hemispheres), be it by hydraulic, pneumatic, screw, electrical or other linear motion drive device, in a manner such that the moveable peeler cup (4) at one end of the machine is closing in relation to the fixed peeler cup (3) at the same end, while the other peeler cup (4), at the opposite end of the first, is opening with respect to its matching fixed peeler cup (3). In so doing, and by the nature of the back and forth motion of the linear drive device, there is a doubling of the productivity of the machine cycle. The machine cycle encompasses the linear movement of the two moveable peeler cups (4), each attached to one of the two extreme ends of the linear actuator (2) and guided linearly by the guide rails (17) which slide on bearing seats (18) mounted transversely and coincidentally with each other, being that the moveable peeler cups (4) move in the direction of the fixed peeler cups (3) which in turn are firmly attached to a structural chassis (1), while the motion of said moveable peeler cups (4) is solidly transmitted to vertical rods (6), in a synchronized manner such that these vertical rods will touch and initiate a linear dislodging of the feeder mechanism's spring (5), thus allowing one of the fruit (19) to drop through the feeder duct and into the chamber formed by the intermeshing of the moveable peeler cup (4) and its matched pair fixed peeler cup (3).

In continuation of the extraction cycle, the fruit (19) now held in the chamber formed by the intermeshing of the moveable peeler cup (4) and its matched pair fixed peeler cup (3), is then pressed by the moveable peeler cup (4) into the fixed peeler cup (3), since both have multiple radially cut openings, the action causes the skin of the fruit to be sheared in multiple strips (12) which pass through the peeler cups' radial openings and fall vertically, while the fruit's core (13) is taken inside the filtering device (7 or F) since this filtering device has a circular sharp cutting point at its forward opening, permitting the fruit's core (13) to enter completely into the filter (7), which has radially cut slits which allow for the extracted juice (11) to flow through and be collected in the space formed by the inside of the fixed peeler cup (3) and the juice collector (10). It is noted that the moveable peeler cup (4) has a concentric central pin (25) and the fixed peeler cup (3) has a perforating tube filter (7) that alternatively is referred to, inter alia, as a filtering device, and a filter, and is included within the scope of the term "filtering means."

In the final stages of the extraction cycle, as the moveable peeler cups (4) move back and away from the fixed peeler cups (3), linear actuators (16) drive the pull rods (15) which in turn are attached to a transverse cross member (9) to which the plunger (8) is firmly fixed, thus driving said plunger (8) to travel through the filter and to push directly on the fruit's core (13) until said core is expelled completely from the forward end of the filter and, finally, the dried fruit core falls into and through the chamber formed by the fixed (3) and moveable (4) peeler cups, and is directed to further fall through the fruit core receiving duct (14), in a manner so that all of the by-products being produced: juice (11 or J), peel (12 or P) and core (13 or C), can now be directed respectively to other stages of processing. With the moveable peeler cup (4) in the full open position, the machine is ready to commence another fruit juice extraction cycle. Given that the geometry and configuration is as shown, one can see that the pair of peeler cups (3) and (4) at one end of the machine will be exactly 180 degrees out of phase with respect to the pair of peeler cups at the opposite end of said machine. At either end of the machine, or, at either pair of peeler cups, the juice extraction cycle is exactly identical and fully described above.

Further as to the respective ends being 180 degrees out of phase, FIG. 1, on the left side, depicts a moveable peeler cup in the full open position, as well as the expulsion of the fruit's core and its falling into the fruit core collector duct, as well as the vertical falling of the sheared peeled skins. On the right side of FIG. 1, one can observe the closed position of the moveable peeler cup, fully engaged with the fixed peeler cup, as well as the juice being filtered through the filtering device while the fruit's core remains inside the filter itself at this point in the extraction cycle. Also shown is the juice being collected in the juice collection chamber, sheared peel skin strips falling vertically down and, finally, dried fruit cores falling further through the fruit core receiving duct, in a manner that all of the byproducts being produced can now be directed respectively to other stages of processing.

Figure 4:
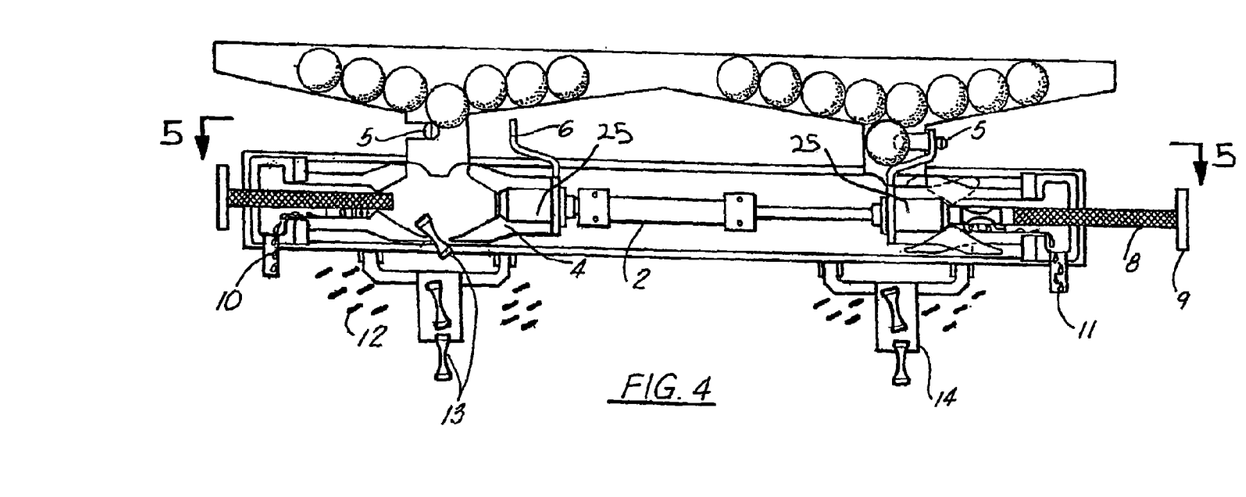
Figure 5:
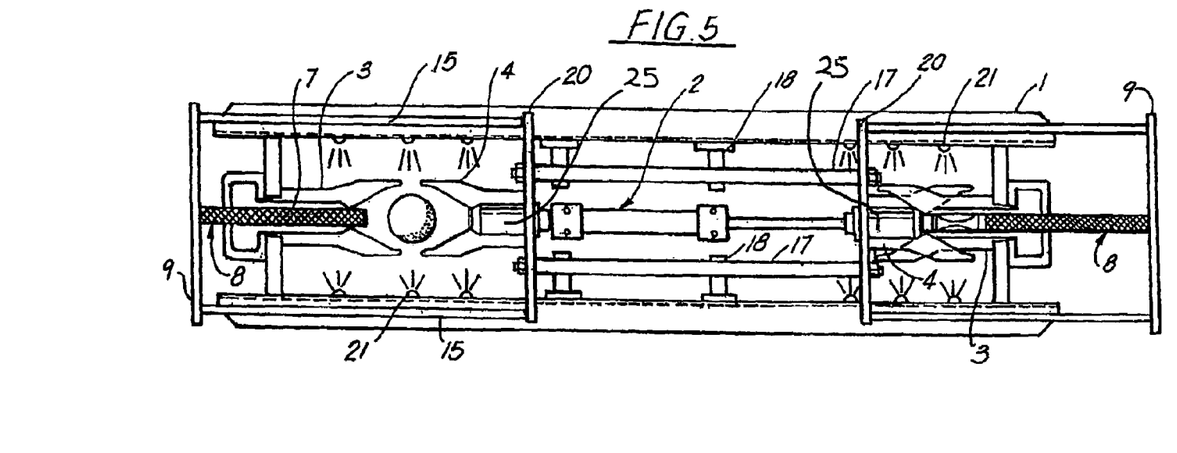
FIG. 5: A top view of the invention, in its second embodiment or version of FIG. 4 taken along the LINE 5—5 of FIG. 4. The third embodiment or version is NOT SHOWN in the drawing.
Figure 6:
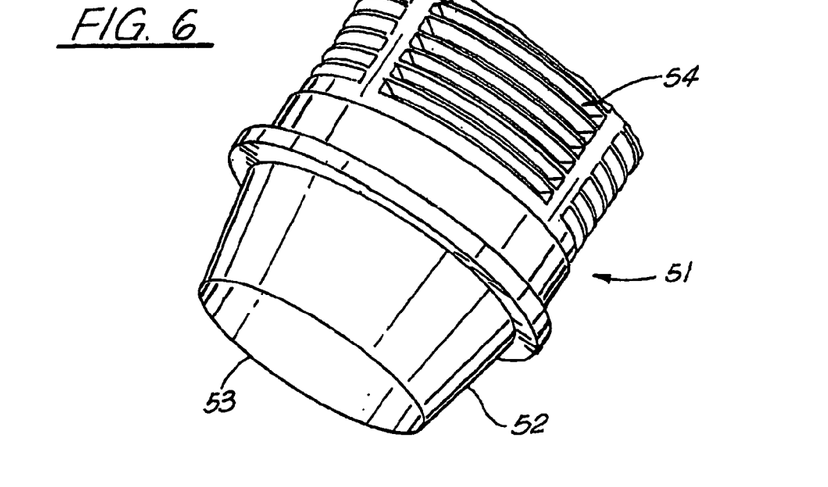
FIG. 6: A partial perspective view of the main body the filter showing the conical section transverse radial slits and the removable cylindrical perforating cutting edge as attached to the main body of said filter.
Figure 7:
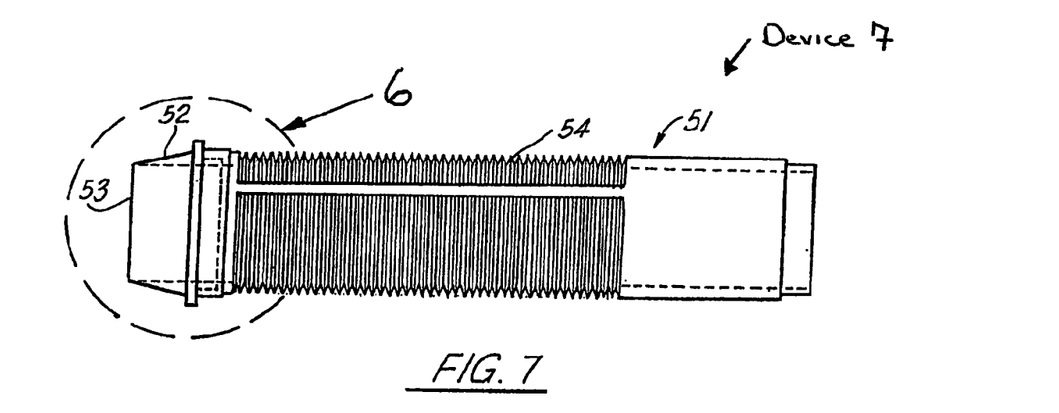
FIG. 7: A side view of the filter showing the conical section transverse radial slits and the removable cylindrical perforating cutting edge as attached to the main body of said filter.
Figure 8:
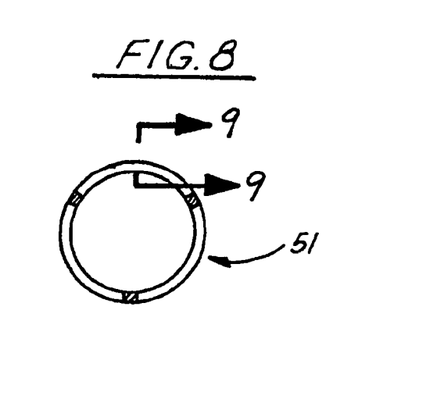
FIG. 8: A typical cross sectional view of the main body of the filter.
Figure 9:
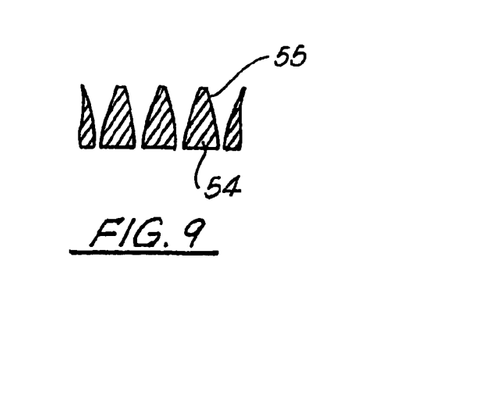

In the second embodiment or version of this invention, there is an alternate way of driving the plunger (8), but the fruit juice extraction cycle is the same as in the first version described above. As shown in FIGS. 4 and 5, a linear actuator (2) drives two moveable peeler cups (4), each attached to one of the two extreme ends of the linear actuator (2) and guided linearly by the guide rails (17) which slide on bearing seats (18) mounted transversely and coincidentally with each other, being that the moveable peeler cups (4) move in the direction of the fixed peeler cups (3) which in turn are firmly attached to a structural chassis (1), while the motion of said moveable peeler cups (4) is solidly transmitted to vertical rods (6), in a synchronized manner such that these vertical rods will touch and initiate a linear dislodging the feeder mechanisms spring (5), thus allowing one of the fruit (19) to drop through the feeder duct and into the chamber formed by the intermeshing of the moveable peeler cup (4) and its matched pair fixed peeler cup (3). In continuation of the extraction cycle, the fruit (19) now held in the chamber formed by the intermeshing of the moveable peeler cup (4) and its matched pair fixed peeler cup (3), is then pressed by the moveable peeler cup (4) into the fixed peeler cup (3), since both have multiple radially cut openings, the action causes the skin of the fruit to be sheared in multiple strips (12) which pass through the peeler cups radial openings and fall vertically, while the fruit's core (13) is taken inside the filtering device (7) since this filtering device has a circular sharp cutting point at its forward opening, permitting the fruit's core to enter completely into the filter (7), which has radially cut slits which allow for the extracted juice (11) to flow through and be collected in the space formed by the inside of the fixed peeler cup (3) and the juice collector (10). In the final stages of the extraction cycle, driven by the action of linear actuator (2), the moveable peeler cup (4) moves back and away from the fixed peeler cup (3), and since it is solidly fixed to a transverse cross member (20), causes the simultaneously driving of said cross member (20) which in turn is attached through the pull rods (15) to another transverse cross member (9) at the opposite end, to which plunger (B) is firmly fixed, thus driving said plunger (8) to travel through the filter and push directly on the fruit's core (13) until said core is expelled completely from the forward end of the filter (7) and, finally, the dried fruit core (13) falls into and through the chamber formed by the fixed (3) and moveable (4) peeler cups, and is directed to further fall through the fruit core receiving duct (14), in a manner so that all of the byproducts being produced: juice (11), peel (12) and core (13), can now be directed respectively to other stages of processing. With the moveable peeler cup (4) in the full open position, the machine is ready to commence another fruit juice extraction cycle. Given that the geometry and configuration is as shown, one can see that the pair of peeler cups (3) and (4) at one end of the machine will be exactly 180 degrees out of phase with respect to the pair of peeler cups at the opposite end of said machine. At either end of the machine, or, at either pair of peeler cups, the juice extraction cycle is exactly identical and fully described above.

It can be understood that there is yet another manner of driving the plunger (8) (although NOT shown in FIGS. 1–5), that is by placing a linear actuator fixed directly to structural chassis (1) and attaching the driving end of said actuator to plunger (8), one can drive said plunger (8) to travel through the filter (7) and push directly on the fruit's core (13) until said core is expelled completely from the forward end of the filter and, finally, the dried fruit core falls into and through the chamber formed by the fixed (3) and moveable (4) peeler cups, and is directed to further fall through the fruit core receiving duct (14), in a manner so that all of the byproducts being produced: juice (11), peel (12) and core (13), can now be directed respectively to other stages of processing. With the moveable peeler cup (4) in the full open position, the machine is ready to commence another fruit juice extraction cycle. Given that the geometry and configuration is as shown, one can see that the pair of peeler cups (3) and (4) at one end of the machine will be exactly 180 degrees out of phase with respect to the pair of peeler cups at the opposite end of said machine. At either end of the machine, or, at either pair of peeler cups, the juice extraction cycle is exactly identical and fully described above.

The invention also includes, in all configurations and versions, clean-in-place spray nozzles (21) mounted at different positions on structural chassis (1), in a manner such that liquid and/or vaporized sprays can be utilized automatically, controlled by computer or other methods, for automatic cleaning of the machine at predetermined time periods as deemed necessary.

The "IMPROVED CONFIGURATION FOR A SELF-CLEANING FILTER WITH REMOVABLE PERFORATING POINT FOR THE EXTRACTION OF FRUIT JUICE," object of this application for utility patent, consists of a cylindrical filtering device such as device 7 or F of the invention in "IMPROVEMENTS IN A MODULAR FRUIT JUICE EXTRACTION SYSTEM" illustrated in FIGS. 1–5. Device 7, details of which are best seen in FIGS. 6–9, has a filter body (51) constructed of stainless steel or other food grade, nontoxic materials developed with the purpose of obtaining high quality and large quantities of juice from citrus fruit and other round or near-round non-citrus fruit.

The main body (51) of the filter is in a tubular cylindrical shape where at one extreme end a removable cylindrical perforating cutting edge (52) is attached, by threads or other methods, and is constructed so as to terminate in a sharp knife edged circular point (53), which functions by first perforating the fruit's peel in a manner such that permits the pumping action of a moveable peeler cup (6) (a concave and radially cut hemisphere) to force a core section (13 or C) of fruit to enter completely into said filter (7 or F), where simultaneously, due to the high pressure generated by the action, the juice (11 or J) is forced to flow through the multitude of conically shaped transverse radial slits that are positioned parallel with respect to each other, thus separating and filtering the liquid juice (J) from solid components of the fruit's core (C).

The filter's main body (51) is of constant cylindrical shape with a removable cylindrical perforating cutting edge (52) attached at one extreme end of said main body (51), which in turn is configured to have a multitude of transverse radial slits (54) with conical, or V-shaped, format, positioned parallel with respect to each other (55), and which can be spaced and sized variably, dependent on the juice (J) product desired to be produced. The nature and numbers of the multitude of transverse radial slits (54) with conical, or V-shaped, generate greater efficiency and yield in juice extraction, since this shape generates a greater pressure differential between the inside and outside portions of the filter, in fact, inducing a "Venturi Effect" which accelerates juice flow from the inside to the outside of the filter, thus promoting greater juice (J) yield and greater productivity by helping to maintain these passageways clear of obstructions and reducing clogging and cleaning frequency.

FIG. 1 shows, as an example, a juice extraction machine, where one can observe the positioning of the self-cleaning filters (7 or F), object of this application for "IMPROVED CONFIGURATION FOR A SELF-CLEANING FILTER WITH REMOVABLE PERFORATING POINT FOR THE EXTRACTION OF FRUIT JUICE," where all byproducts of extraction, such as juice (J), extracted from the fruit's core (C) and peel skin strips (P) were obtained from the fruit (19 or R). Also shown in FIG. 1, is the layout of the fruit bin placement as well as the fixed peeler cups (3) and moveable peeler cups (4) and the linear actuator (2) which drives the moveable peeler cups (4) against the fixed peeler cups (3) while simultaneously actuating the feeder spring (5) which permits the continuous and synchronized feeding of fruit (R) for juice (J) extraction.

Figure 10:
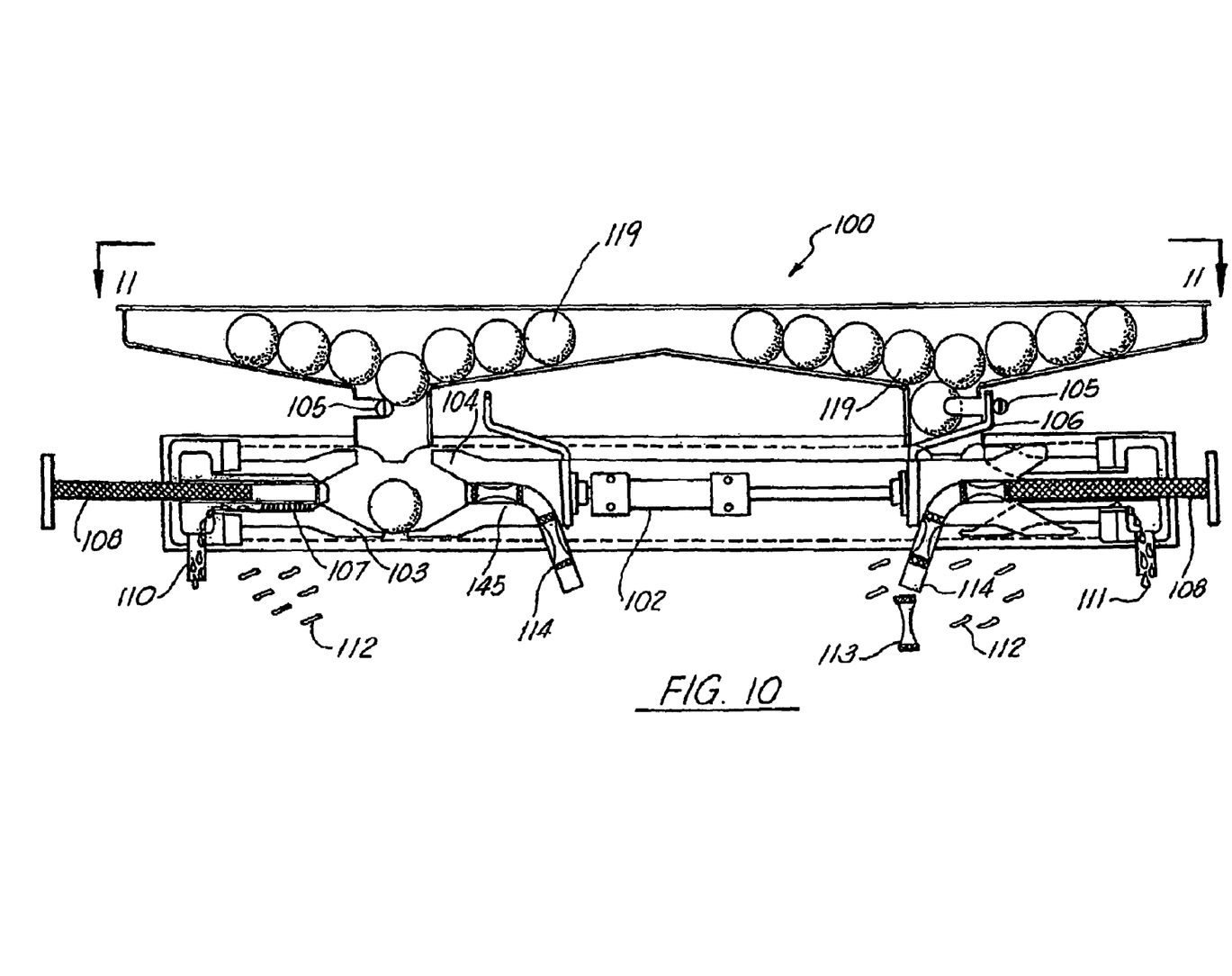
Figure 11:
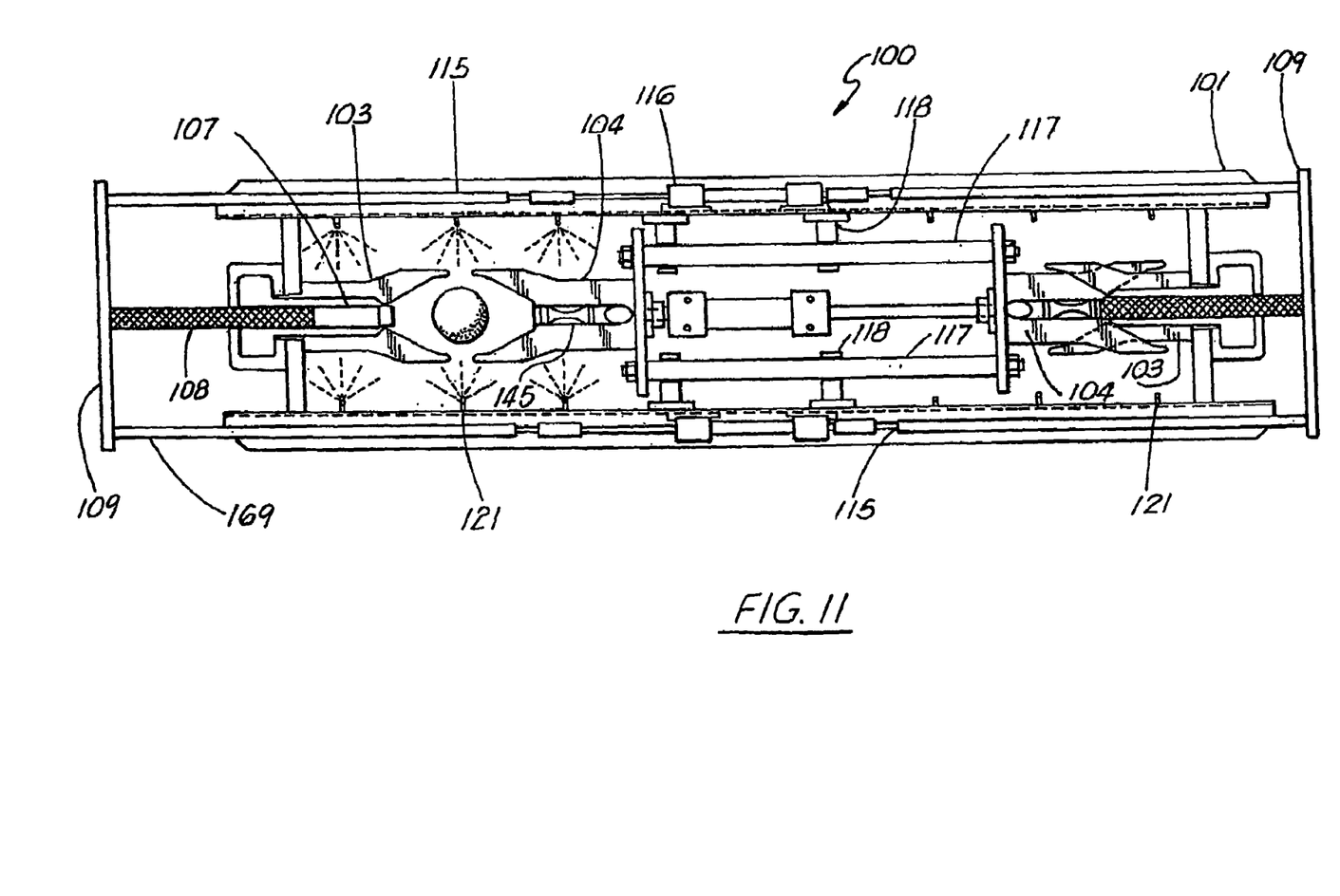
FIG. 11: A top view of the embodiment of the invention of FIG. 10 taken along the LINE 11—11 of FIG. 10.

In the third embodiment or version 100 (the 100 series is used to identify identical components to the first and second embodiments unless a specific description is given, i.e., filtering device (107) is identical to filtering device (7)), as best seen in FIGS. 10–11, a linear actuator (102) drives moveable peeler cups (104) (concave and radially cut hemispheres), be it by hydraulic, pneumatic, screw, electrical or other linear motion drive device, in a manner such that the moveable peeler cup (104) at one end of the machine is closing in relation to the fixed peeler cup (103) at the same end, while the other peeler cup (104), at the opposite end of the first, is opening with respect to its matching fixed peeler cup (103). In so doing, and by the nature of the back and forth motion of the linear drive device, there is a doubling of the productivity of the machine cycle. The machine cycle encompasses the linear movement of the two moveable peeler cups (104), each attached to one of the two extreme ends of the linear actuator (102) and guided linearly by the guide rails (117) which slide on bearing seats (118) mounted transversely and coincidentally with each other, being that the moveable peeler cups (104) move in the direction of the fixed peeler cups (103) which in turn are firmly attached to a structural chassis (101), while the motion of said moveable peeler cups (104) is solidly transmitted to vertical rods (106), in a synchronized manner such that these vertical rods will touch and initiate a linear dislodging of the feeder mechanism's spring (105), thus allowing one of the fruit (119) to drop through the feeder duct and into the chamber formed by the intermeshing of the moveable peeler cup (104) and its matched pair fixed peeler cup (103).

In continuation of the extraction cycle, the fruit (119) now held in the chamber formed by the intermeshing of the moveable peeler cup (104) and its matched pair fixed peeler cup (103), is then pressed by the moveable peeler cup (104) into the fixed peeler cup (103), since both have multiple radially cut openings, the action causes the skin of the fruit to be sheared in multiple strips (112) which pass through the peeler cups' radial openings and fall vertically, while the fruit's core (113) is taken inside the filtering device (107) since this filtering device has a circular sharp cutting point (such as point 53 of filtering device 7) at its forward opening, permitting the fruit's core (113) to enter completely into the filter (107), which has radially cut slits which allow for the extracted juice (111) to flow through and be collected in the space formed by the inside of the fixed peeler cup (103) and the juice collector (110).

In the final stages of the extraction cycle, as the moveable peeler cups (104) move back and away from the fixed peeler cups (103), linear actuators (116) drive the pull rods (115, 169) which in turn are attached to a transverse cross member (109) to which the plunger (108) is firmly fixed, thus driving said plunger (108) to travel through the filter and to push directly on the fruit's core (113) until said core is expelled completely from the forward end of the filter and, finally, the dried fruit core is forced (by a following core) through the chamber (145) positioned at the inner or back end of moveable peeler cup (104), and is directed to further pass through the fruit core receiving duct (114) which is integral with core chamber (145) and angulated downwardly so that the fruit's core (113) can actually fall under the force of gravity through the duct (114), in a manner so that all of the by-products being produced: juice (111), peel (112) and core (113), can now be directed respectively to other stages of processing. With the moveable peeler cup (104) in the full open position, the machine is ready to commence another fruit juice extraction cycle. Given that the geometry and configuration is as shown, one can see that the pair of peeler cups (103) and (104) at one end of the machine will be exactly 180 degrees out of phase with respect to the pair of peeler cups at the opposite end of said machine. At either end of the machine, or, at either pair of peeler cups, the juice extraction cycle is exactly identical and fully described above.

Embodiment 100 also includes clean-in-place spray nozzles (121) mounted at different positions on structural chassis (101), in a manner such that liquid and/or vaporized sprays can be utilized automatically, controlled by computer or other methods, for automatic cleaning of the machine at predetermined time periods as deemed necessary.

Figure 12:
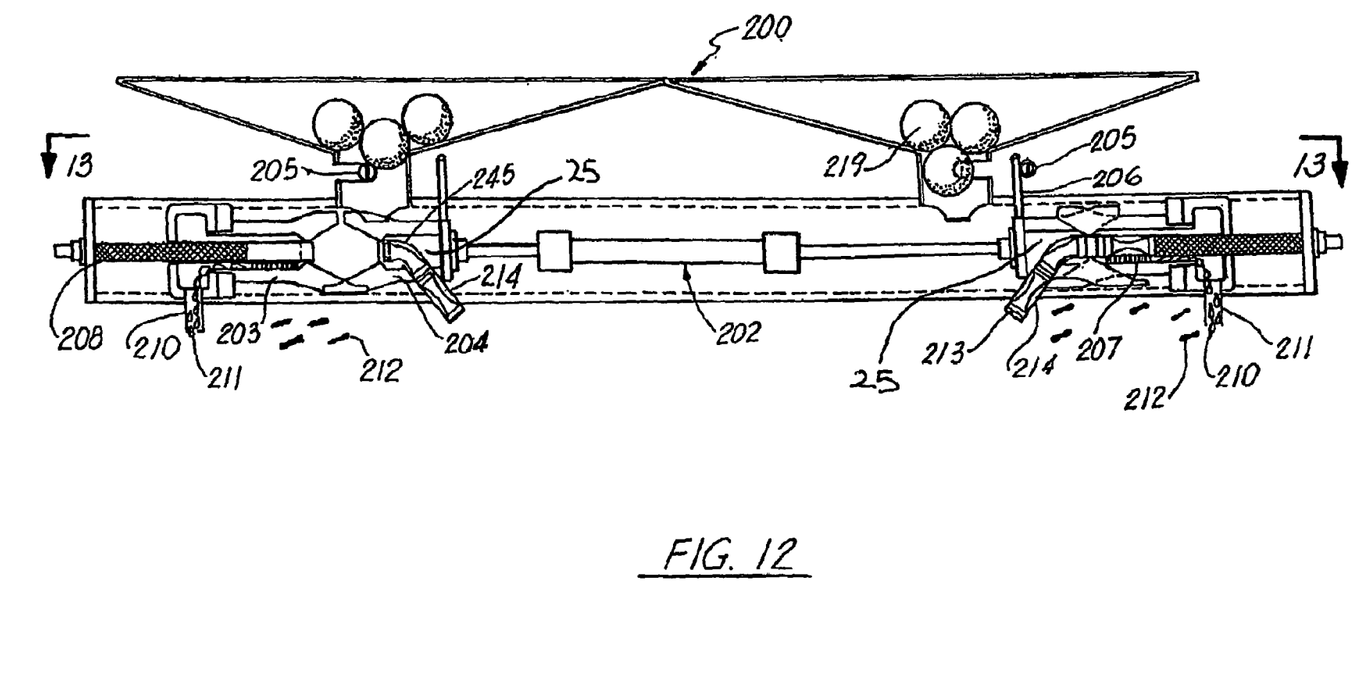
Figure 13:
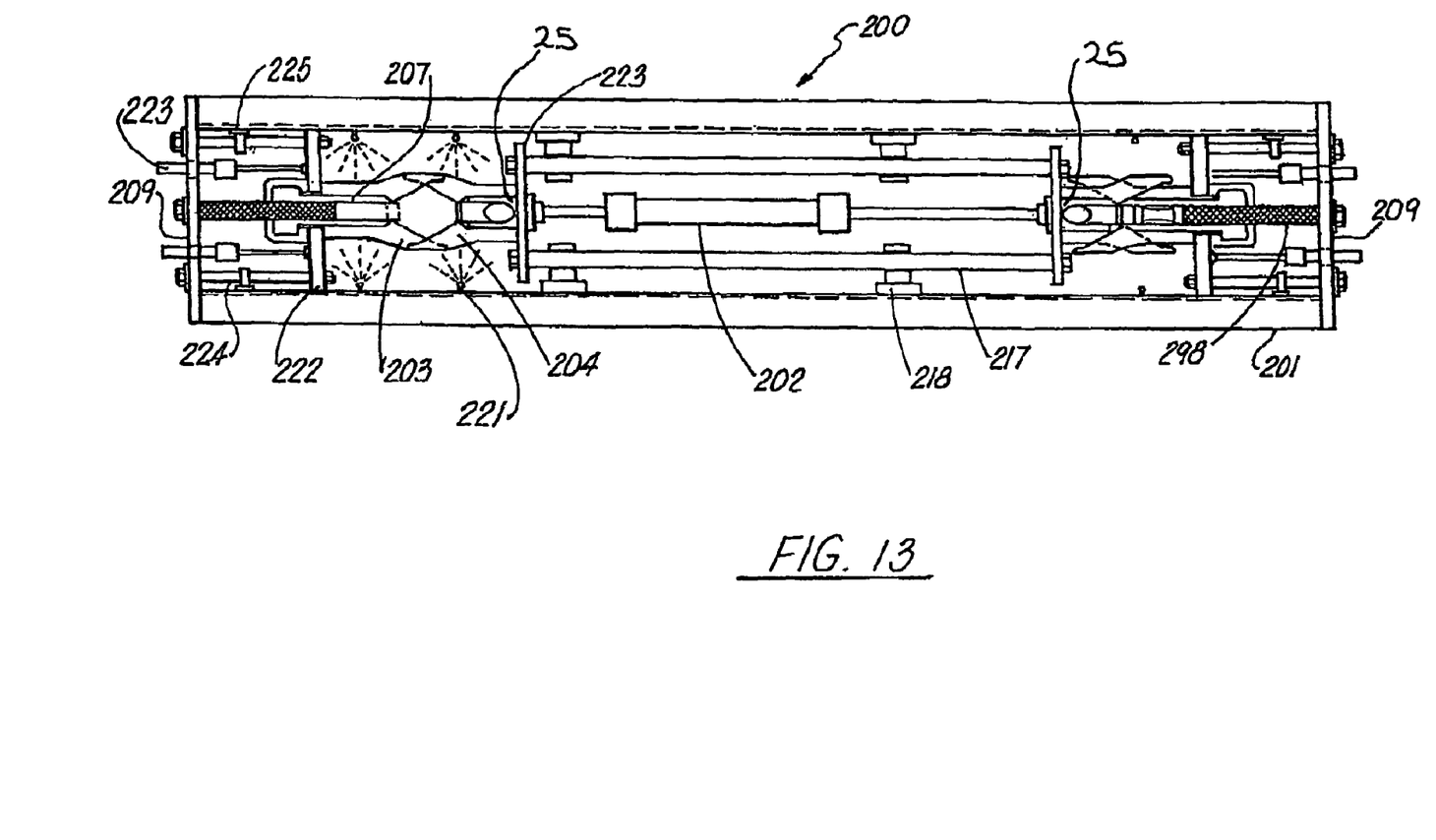

In the fourth embodiment or version 200 (the 200 series is used to identify identical components to the first through third embodiments unless a specific description is given, i.e., filtering device (207) is identical to filtering devices (7) and (107)), as best seen in FIGS. 12–13, a linear actuator (202) drives both external moveable peeler cups (203) and internal moveable peeler cups (204) (concave and radially cut hemispheres), be it by hydraulic, pneumatic, screw, electrical or other linear motion drive device, in a manner such that the internal moveable peeler cup (204) at one end of the machine is closing in relation to the external movable peeler cup (203) at the same end, while the other internal movable peeler cup (204), at the opposite end of the first, is fully closed with respect to its matching external movable peeler cup (203). In so doing, and by the nature of the back and forth motion of the linear drive device, there is enhanced productivity of the machine cycle. The machine cycle encompasses the linear movement of the two internal moveable peeler cups (204) each attached to one of the two extreme ends of the linear actuator (202) and guided linearly by the guide rails (217) which slide on bearing seats (218) mounted transversely and coincidentally with each other, being that the internal moveable peeler cups (204) move in the direction of the external moveable peeler cups (203) which in turn have linear movement as each attached to one of the two extreme ends of the linear actuator (202) and guided linearly by the secondary guide rails (224) which slide on secondary bearing mounts (225) mounted transversely and coincidentally with each other and are firmly attached to a structural chassis (201), while the motion of said moveable peeler cups (203, 204) is solidly transmitted to vertical rods (206), in a synchronized manner such that these vertical rods will touch and initiate a linear dislodging of the feeder mechanism's spring (205), thus allowing one of the fruit (219) to drop through the feeder duct and into the chamber formed by the intermeshing of the internal moveable peeler cup (204) and its matched pair external moveable peeler cup (203).

In continuation of the extraction cycle, the fruit (219) now held in the chamber formed by the intermeshing of the internal moveable peeler cup (204) and its matched pair external moveable peeler cup (203), is then pressed by the internal moveable peeler cup (204) into the external moveable peeler cup (203), since both have multiple radially cut openings, the action causes the skin of the fruit to be sheared in multiple strips (212) which pass through the peeler cups' radial openings and fall vertically, while the fruit's core (213) is taken inside the filtering device (207) since this filtering device has a circular sharp cutting point (such as point 53 of filtering device 7) at its forward opening, permitting the fruit's core (213) to enter completely into the filter (207), which has radially cut slits which allow for the extracted juice (211) to flow through and be collected in the space formed by the inside of the external moveable peeler cup (203) and the juice collector (210).

In the final stages of the extraction cycle, as the internal moveable peeler cups (204) move back and away from the external moveable peeler cups (203), linear actuator (202) drives the peeler cup supports (222, 223) which in turn are attached to a transverse cross member (209) to which the plunger (208) is firmly fixed, thus driving said plunger (208) to travel through the filter (207) and to push directly on the fruit's core (213) until said core is expelled completely from the forward end of the filter and, finally, the dried fruit core is forced (by a following core) through the chamber (245) positioned at the inner or back end of internal moveable peeler cup (204), and is directed to further pass through the fruit core receiving duct (214) which is integral with core chamber (245) and angulated downwardly so that the fruit's core (213) can actually fall under the force of gravity through the duct (214), in a manner so that all of the by-products being produced: juice (211), peel (212) and core (213), can now be directed respectively to other stages of processing. With the internal moveable peeler cup (204) in the full open position, the machine is ready to commence another fruit juice extraction cycle. Given that the geometry and configuration is as shown, one can see that the pair of moveable peeler cups (203) and (204) at one end of the machine will be out of phase (but not by 180 degrees) with respect to the pair of peeler cups at the opposite end of said machine. At either end of the machine, or, at either pair of peeler cups, the juice extraction cycle is exactly identical and fully described above.

Embodiment 200 also includes clean-in-place spray nozzles (221) mounted at different positions on structural chassis (201), in a manner such that liquid and/or vaporized sprays can be utilized automatically, controlled by computer or other methods, for automatic cleaning of the machine at predetermined time periods as deemed necessary.

What is claimed is:

1. A fruit juice extraction apparatus comprising: two fixed peeler cups and two moveable peeler cups attached to a chassis in mating pairs of fixed and moveable peeler cups, said cups being concave hemispheres, each pair being located at opposing ends of said chassis, where said moveable peeler cups are each attached to opposing ends of a single linear drive actuator for driving both movable peeler cups in a back and forth cycle, said moveable peeler cup at each of the ends of said linear actuator being driven in a manner such that when one or the other of said moveable peeler cups is opening to allow an article of fruit to fall within a concave chamber formed in conjunction with its mating fixed peeler cup, said moveable peeler cup at the opposing end of said linear actuator is closing upon an other article of fruit inside a respective concave chamber formed by the intermeshing of said moveable and fixed peeler cups, and shearing a skin of said other article of fruit as it initiates a peeling process and continues to complete a juicing cycle by pumping a core of said other article of fruit through one of two filtering means mounted respectively in each of said mating fixed peeler cups, each said filtering means having a cutting point at its forward opening and radially cut slits to permit said fruit's core to enter completely into said filtering means which allows for the extracted juice to flow through and be collected in juice collection means connected to said fixed peeler cup, followed by the motion of one of two plungers, associated respectively with each of the two fixed peeler cups, which travels through said respective filtering means and pushes directly on said other article of fruit's core until said core is expelled completely from the forward end of said respective filtering means and, whereby, the each dried core falls into and through the respective concave chamber formed by said respective fixed and moveable peeler cups, and is directed to further fall through a respective fruit core receiving means, whereby when one of said moveable peeler cups is in the full open position, said apparatus is positioned to commence another fruit juice extraction cycle.

2. The apparatus of claim 1, wherein said pair of peeler cups positioned at one end of said apparatus are 180 degrees out of phase with respect to said pair of peeler cups at the opposing end of said apparatus.

3. The apparatus of claim 1, wherein when one of said moveable peeler cups moves back and away from one of said fixed peeler cups, said linear drive actuator drives said respective plunger through said respective filtering means, whereby said fruit's core is expelled completely from the forward end of said respective filtering means and falls into and through said respective chamber formed by said fixed and moveable peeler cups.

4. The apparatus of claim 1, further comprising spray nozzles mounted at selected positions on said chassis.

5. A fruit juice extraction apparatus comprising:
a chassis having mounted thereon juice extraction means;
said juice extraction means having means for storing articles of fruit, said storing means having a plurality of apertures therein for allowing said articles of fruit to be deposited between at least two pairs of mating concave hemispheres, each of said pairs having one movable and one fixed hemisphere;
drive means for actuating means for forcing each of the movable of said concave hemispheres against its mating fixed concave hemisphere, thereby pressing one of said articles of fruit deposited between said hemispheres;
each of said movable concave hemispheres having a central pin and each of said fixed concave hemispheres having a perforating tube filter for the extraction of juice from said articles of fruit, whereby a core of said one of said articles of fruit is deposited in a receptacle and the juice is passed through the filter and then falls into a reservoir which has outlet ports therein.

6. The apparatus of claim 5, wherein said perforating tube filter has multiple transverse slits of increasing diameter from inside to outside.

7. The apparatus of claim 5, each of said concave hemispheres having its concave surface defined by a plurality of spaced-apart radial blades.

8. The apparatus of claim 7, wherein said radial blades of each of said hemispheres are of at least two different lengths.

9. The apparatus of claim 8, wherein when said movable hemisphere is forced against its mating fixed hemisphere, said radial blades of said movable hemisphere are positioned intermediate said radial blades of said fixed hemisphere.

10. The apparatus of claim 5, wherein said movable hemispheres are attached to opposing ends of said forcing means for driving both movable hemispheres in a back and forth cycle, said moveable hemispheres at each of the ends of said forcing means being driven in a manner such that when one of said movable hemispheres is opening to allow said article of fruit to fall between it and its mating fixed hemisphere, said moveable hemisphere at the opposing end of said forcing means is closing upon said fruit between it and said other of said fixed hemispheres and shearing said fruit's skin as it initiates a peeling process and continues to complete juicing by forcing said fruit's core through its said perforating tube filter, whereby extracted juice flows to said reservoir.

11. The apparatus of claim 10, further comprising a respective plunger which moves through said respective perforating tube filter and expels said fruit's core from a forward end of said respective perforating tube filter and, whereby when one of said moveable hemispheres is in the full open position, said apparatus is positioned to commence another fruit juice extraction cycle.

12. A fruit juice extraction apparatus comprising:
a chassis having mounted thereon juice extraction means;
said juice extraction means having means for storing articles of fruit, said storing means having a plurality of apertures therein for allowing said articles of fruit to be deposited between at least two pairs of mating radially cut and concave hemispheres, each of said pairs having one movable and one fixed hemisphere;
drive means for actuating means for forcing each of the movable of said concave hemispheres against its mating fixed concave hemisphere, thereby pressing one of said articles of fruit deposited between said hemispheres;
each of said movable concave hemispheres having a central pin and each of said fixed concave hemispheres having a perforating tube filter for the extraction of juice from said articles of fruit, whereby a core of said one of said articles of fruit is deposited in a receptacle and the juice is passed through the filter and then falls into a reservoir which has outlet ports therein;
said filter comprising a cylindrical filter body of nontoxic materials, having connected at one end thereof a removable cylindrical perforating cutting edge terminating in a circular point, for perforating the peel of said article of fruit, whereby said moveable concave and radially cut hemisphere forces a core section of said fruit to enter said filter body, said filter body having a plurality of spaced-apart parallel transverse radial slits.

13. The apparatus of claim 12, wherein said transverse slits are of increasing diameter from inside to outside.

14. A fruit juice extraction apparatus comprising: two fixed peeler cups and two moveable peeler cups attached to a chassis in mating pairs of fixed and moveable peeler cups, said cups being concave hemispheres, each pair being located at opposing ends of said chassis, where said moveable peeler cups are each attached to opposing ends of a single linear drive actuator for driving both movable peeler cups in a back and forth cycle, said moveable peeler cup at each of the ends of said linear actuator being driven in a manner such that when one of said peeler cups is opening to allow a first article of fruit to fall within a respective concave chamber formed in conjunction with its mating fixed peeler cup, said moveable peeler cup at the opposing end of said linear actuator is closing upon a second article of fruit inside a second respective concave chamber formed by the intermeshing of said moveable and fixed peeler cups, and shearing a skin of said second article of fruit as it initiates a peeling process and continues to complete a juicing cycle by pumping a core of said second article of fruit through a respective filtering means mounted in said mating fixed peeler cup, said respective filtering means having a cutting point at its forward opening and radially cut slits to permit said second article of fruit's core to enter said respective filtering means which allows for the extracted juice to flow through and be collected in a juice collection means connected to said fixed peeler cup, followed by the motion of one of two plungers associated respectively with each of the two fixed peeler cups, which travels through said filtering means and pushes directly on said second article of fruit's core until said second article of fruit's core is expelled completely from the forward end of said filtering means and, whereby, the dried fruit core of said second article of fruit is forced through said moveable peeler cups, and is directed to further fall through a fruit core receiving means, whereby when said moveable peeler cup is in the full open position, said apparatus is positioned to commence another fruit juice extraction cycle.

15. The apparatus of claim 14, wherein said pair of peeler cups positioned at one end of said apparatus are 180 degrees out of phase with respect to said pair of peeler cups at the opposing end of said apparatus.

16. The apparatus of claim 14, wherein when one of said moveable peeler cups moves back and away from one of said fixed peeler cups, said linear drive actuator drives said respective plunger through said respective filtering means, whereby the core of one of the articles of said fruit is expelled completely from the forward end of said respective filtering means and the dried fruit core falls into and through said respective chamber formed by said respective fixed and moveable peeler cups.

17. The apparatus of claim 14, further comprising spray nozzles mounted at selected positions on said chassis.

18. The apparatus of claim 14, wherein a respective channel means is positioned in each of said moveable peeler cups to direct a number of fruit cores forced through each respective moveable peeler cup to further fall through said fruit core receiving means, said receiving means being angulated downwardly with respect to said moveable peeler cup within which it is positioned.

19. A fruit juice extraction apparatus comprising:
a chassis having mounted thereon juice extraction means;
said juice extraction means having means for storing articles of fruit, said storing means having a plurality of apertures therein for allowing said articles of fruit to be deposited between at least two pairs of mating concave hemispheres, each of said pairs having one movable and one fixed hemisphere;
drive means for actuating means for forcing each of the movable of said concave hemispheres against its mating fixed concave hemisphere, thereby pressing one of said articles of fruit deposited between said hemispheres;
each of said movable concave hemispheres having a respective central pin and each of said fixed concave hemispheres having a perforating tube filter for the extraction of juice from said articles of fruit, whereby the juice is passed through the filter and then falls into a reservoir which has outlet ports therein and dried fruit cores of said articles of fruit are forced through said moveable peeler cups, and are deposited in a receptacle.

20. The apparatus of claim 19, herein said perforating tube filter has multiple transverse slits of increasing diameter from inside to outside.

21. The apparatus of claim 19, each of said concave hemispheres having its concave surface defined by a plurality of spaced-apart radial blades.

22. The apparatus of claim 21, wherein said radial blades of each of said hemispheres are of at least two different lengths.

23. The apparatus of claim 22, wherein when said movable hemisphere is forced against its mating fixed hemisphere, said radial blades of said movable hemisphere are positioned intermediate said radial blades of said fixed hemisphere.

24. The apparatus of claim 19, wherein said movable hemispheres are attached to opposing ends of said forcing means for driving both movable hemispheres in a back and forth cycle, said moveable hemispheres at each of the ends of said forcing means being driven in a manner such that when one of said movable hemispheres is opening to allow one of said articles of fruit to fall between it and its mating fixed hemisphere, said moveable hemisphere at the opposing end of said forcing means is closing upon an other of said articles of fruit between it and said other of said fixed hemispheres and shearing a skin of said other article of fruit as it initiates a peeling process and continues to complete juicing by forcing a core of said other article of fruit through its said respective perforating tube filter, whereby extracted juice flows to said reservoir.

25. The apparatus of claim 24, further comprising two plungers, a respective one of which moves through each of said perforating tube filters and expels cores of said articles of fruit from the forward end of said respective perforating tube filter and, whereby when one of said moveable hemispheres is in the full open position, said apparatus is positioned to commence another fruit juice extraction cycle.

26. A fruit juice extraction apparatus comprising: two sets of moveable peeler cups attached to a chassis in mating pairs of internal and external moveable peeler cups, said cups being concave hemispheres, each pair being located at opposing ends of said chassis, where said internal moveable peeler cups are each attached to opposing ends of a linear drive actuator for driving both sets of movable peeler cups in a back and forth cycle, said internal moveable peeler cups at each of the ends of said linear actuator being driven in a manner such that when one or the other of said internal peeler cups is opening to allow an article of fruit to fall within a concave chamber formed in conjunction with its mating external peeler cup, said internal moveable peeler cup at the opposing end of said linear actuator is closing upon an other article of fruit inside a respective concave chamber formed by the intermeshing of said internal and external moveable peeler cups, and shearing a skin of said other article of fruit as it initiates a peeling process and continues to complete a juicing cycle by pumping a core of said other article of fruit through one of two filtering means mounted respectively in each of said mating fixed peeler cups, each said filtering means having a cutting point at its forward opening and radially cut slits to permit said core to enter completely into said filtering means which allows for the extracted juice to flow through and be collected in juice collection means connected to said fixed peeler cup, followed by an outward motion of the respective external moveable peeler cup so that one of two plungers associated respectively with each of the two external moveable peeler cups travels through said respective filtering means and pushes directly on said other article of fruit's core until said core is expelled completely from the forward end of said respective filtering means and, whereby, the each dried core is forced through said respective internal moveable peeler cup, and is directed to further fall through a respective fruit core receiving means, whereby when said moveable peeler cup is in the full open position, said apparatus is positioned to commence another fruit juice extraction cycle.

27. The apparatus of claim 26, wherein said pair of peeler cups positioned at one end of said apparatus are 180 degrees out of phase with respect to said pair of peeler cups at the opposing end of said apparatus.

28. The apparatus of claim 26, wherein when said internal moveable peeler cups move back and away from said external peeler cups, said linear drive actuator drives said plunger through said filtering means, whereby said fruit's core is expelled completely from the forward end of said filtering means and the dried fruit core falls into and through said chamber formed by said internal and external moveable peeler cups.

29. The apparatus of claim 26, further comprising spray nozzles mounted at selected positions on said chassis.

30. The apparatus of claim 26, wherein a channel means is positioned in each of said internal moveable peeler cups to direct a number of fruit cores forced through said internal moveable peeler cups to further fall through said fruit core receiving means, said receiving means being angulated downwardly with respect to the said internal moveable peeler cup within which it is positioned.

31. A fruit juice extraction apparatus comprising:
a chassis having mounted thereon juice extraction means;
said juice extraction means having means for storing articles of fruit, said storing means having a plurality of apertures therein for allowing said articles of fruit to be deposited between at least two pairs of mating concave hemispheres, each of said pairs having one internal movable and one external moveable hemisphere;
drive means for actuating means for forcing each of the internal movable of said concave hemispheres against its mating external moveable concave hemisphere, thereby pressing one of said articles of fruit deposited between said hemispheres;
each of said external movable concave hemispheres having a central pin and each of said internal moveable concave hemispheres having a perforating tube filter for the extraction of juice from said articles of fruit, whereby the juice is passed through the filter and then falls into a reservoir which has outlet ports therein and the dried fruit cores of said articles of fruit are forced through said respective internal moveable peeler cups, and are deposited in a receptacle.

32. The apparatus of claim 31, wherein said perforating tube filter has multiple transverse slits of increasing diameter from inside to outside.

33. The apparatus of claim 32, each of said concave hemispheres having its concave surface defined by a plurality of spaced-apart radial blades.

34. The apparatus of claim 33, wherein said radial blades of each of said hemispheres are of at least two different lengths.

35. The apparatus of claim 34, wherein when said internal movable hemisphere is forced against its mating external moveable hemisphere, said radial blades of said internal movable hemisphere are positioned intermediate said radial blades of said fixed hemisphere.

36. The apparatus of claim 32, wherein said internal movable hemispheres are attached to opposing ends of said forcing means for driving both internal movable hemispheres in a back and forth cycle, said internal moveable hemispheres at each of the ends of said forcing means being driven in a manner such that when one of said internal movable hemispheres is opening to allow one of said articles of fruit to fall between it and its mating external moveable hemisphere, said internal moveable hemisphere at the opposing end of said forcing means is closing upon an other of said articles of fruit between it and said other of said external hemispheres and shearing a skin of said other of said articles of fruit as it initiates a peeling process and continues to complete juicing by forcing said fruit's core through its said perforating tube filter, whereby extracted juice flows to said reservoir.

37. The apparatus of claim 36, further comprising two plungers, a respective one of which moves through each of said perforating tube filters and expels cores of said articles of fruit from the forward end of said respective perforating tube filter and, whereby when one of said internal moveable hemispheres is in the full open position, said apparatus is positioned to commence another fruit juice extraction cycle.

* * * * *